(12) United States Patent
Ren et al.

(10) Patent No.: US 10,889,898 B2
(45) Date of Patent: Jan. 12, 2021

(54) METHOD FOR IMPROVING BLOOD COMPATIBILITY OF MATERIAL SURFACE BY USING CONTROLLABLE GRAFTING TECHNIQUE

(71) Applicant: South China University of Technology, Guangzhou (CN)

(72) Inventors: Li Ren, Guangzhou (CN); Yingjun Wang, Guangzhou (CN); Jian Zheng, Guangzhou (CN); Lin Wang, Guangzhou (CN); Sa Liu, Guangzhou (CN)

(73) Assignee: South China University of Technology

( * ) Notice: Subject to any disclaimer, the term of this patent is extended or adjusted under 35 U.S.C. 154(b) by 203 days.

(21) Appl. No.: 16/305,923

(22) PCT Filed: Dec. 8, 2016

(86) PCT No.: PCT/CN2016/109038
§ 371 (c)(1),
(2) Date: Nov. 30, 2018

(87) PCT Pub. No.: WO2017/206472
PCT Pub. Date: Dec. 7, 2017

(65) Prior Publication Data
US 2020/0255951 A1 Aug. 13, 2020

(30) Foreign Application Priority Data
Jun. 1, 2016 (CN) .......................... 2016 1 0389935

(51) Int. Cl.
*C23C 22/02* (2006.01)
*C08F 126/10* (2006.01)
*C23C 22/78* (2006.01)

(52) U.S. Cl.
CPC ............ *C23C 22/02* (2013.01); *C08F 126/10* (2013.01); *C23C 22/78* (2013.01); *C08F 2438/03* (2013.01)

(58) Field of Classification Search
None
See application file for complete search history.

(56) References Cited

U.S. PATENT DOCUMENTS 6,358,557 B1 * 3/2002 Wang .................... A61L 29/085
427/2.24
8,784,862 B2 7/2014 Horres et al.
(Continued)

FOREIGN PATENT DOCUMENTS

CN 1665554 A 9/2005
CN 102307955 A 1/2012
(Continued)

OTHER PUBLICATIONS

Liu et al. Facile Synthesis of Thermally Stable POly(N-vinylpyrrolidone)—Modified Gold Surfaces by Surface-Initiated Atom Transfer Radical Polymerization. Langmuir. 2012 vol. 28 pp. 9451-9459 (Year: 2012).*
(Continued)

*Primary Examiner* — Cachet I Proctor
(74) *Attorney, Agent, or Firm* — The Webb Law Firm

(57) ABSTRACT

The present invention discloses a method for improving the blood compatibility of a material surface by using a controllable grafting technique. The method involves placing a monomer NVP, an RAFT reagent and a solvent acetonitrile in a container, adding an initiator AIBN, mixing the same uniformly, removing oxygen with liquid nitrogen, making the same react in an oil bath; after polymerization, adding liquid nitrogen to quench and stop the reaction, thus obtaining PVP-COOH; mixing the PVP-COOH with DCC and NHS; adding dry dichloromethane to the mixture in a
(Continued)

nitrogen atmosphere, adding mercaptoethylamine, and making the same react in darkness at room temperature; obtaining a crude sample; dissolving the crude sample in water, and performing dialysis with deoxygenated water in darkness, and then obtaining HS-PVP by freeze-drying. An Au—S bond chemisorption method is used to controllably graft an anti-protein high-molecular polymer onto an Au surface.

10 Claims, 6 Drawing Sheets

(56) References Cited

U.S. PATENT DOCUMENTS

| | | | |
|---|---|---|---|
| 9,096,703 B2 | 8/2015 | Li et al. | |
| 9,358,326 B2 | 6/2016 | Zhang et al. | |
| 9,895,470 B2 | 2/2018 | Li et al. | |
| 2003/0199653 A1* | 10/2003 | McCormick, III | C08F 2/44 526/219.6 |
| 2010/0241071 A1* | 9/2010 | Atanasoska | A61L 27/446 604/103.02 |
| 2014/0234157 A1* | 8/2014 | Chen | B22F 27/446 420/507 |
| 2014/0364391 A1* | 12/2014 | Hai | A61K 47/02 514/55 |
| 2016/0024234 A1* | 1/2016 | Wang | C08F 292/00 525/326.7 |

FOREIGN PATENT DOCUMENTS

| | | |
|---|---|---|
| CN | 103037913 A | 4/2013 |
| CN | 104262668 A | 1/2015 |
| CN | 105153455 A | 12/2015 |
| CN | 106119820 A | 11/2016 |
| EP | 2352796 A1 | 8/2011 |
| WO | 2010065958 A1 | 6/2010 |
| WO | 2010065960 A2 | 6/2010 |

OTHER PUBLICATIONS

Zelikin et al. Polyvinylpyrrolidone for Bioconjucation and Surface Ligand Immobilization. Biomacromolecules. vol. 8. 2007. pp. 2950-2953 (Year: 2007).*

Liu et al., "Facile Synthesis of Thermally Stable Poly(N-vinylpyrrolidone)-Modified Gold Surfaces by Surface-Initiated Atom Transfer Radical Polymerization", Langmuir, 2012, pp. 9451-9459, vol. 28.

* cited by examiner

METHOD FOR IMPROVING BLOOD COMPATIBILITY OF MATERIAL SURFACE BY USING CONTROLLABLE GRAFTING TECHNIQUE

CROSS-REFERENCE TO RELATED APPLICATIONS

This application is the United States national phase of International Application No. PCT/CN2016/109038 filed Dec. 8, 2016, which claims priority from Chinese Application No. 201610389935.2 filed Jun. 1, 2016, the disclosures of each of which are hereby incorporated by reference in their entireties.

BACKGROUND OF THE INVENTION

Field of the Invention

The present invention relates to a material with an anti-protein adsorption performance, in particular to a method for improving the blood compatibility of a material surface by using a controllable grafting technique, which is a method for preparing a material surface with an anti-protein adsorption performance.

DESCRIPTION OF RELATED ART

Biocompatibility refers to the various physical and chemical reactions resulted from the interaction between biomedical materials and organisms. It is one of the most important characteristics of biomedical materials. The biocompatibility directly determines whether the material can be applied to organisms. For materials in contact with blood, if the material surface is poorly compatible with blood and uncontrolled, non-specific adsorption of proteins (such as fibrinogen (Fg), human serum albumin (HSA), etc.) on the material surface may cause a series of adverse reactions, such as blood clotting, hemolysis, thrombosis and so on. Therefore, it is very important to prepare a material surface with excellent blood compatibility.

At present, PEG is the most common material to improve the anti-protein adsorption performance of the material surface. However, the degradability of PEG in certain environments limits its application in many fields. Polyvinylpyrrolidone (PVP) is a high-molecular polymer with excellent water solubility, good biocompatibility and chemical stability. It is polymerized from monomer N-vinylpyrrolidone under certain conditions and has been widely used in the fields of biology, medicine, food, materials, etc. PVP has been widely used to prepare a material surface with excellent blood compatibility. Therefore, it has become a research hotspot to improve the anti-protein adsorption performance and the blood compatibility of the material surface. The existing modification methods currently used by researchers can graft PVP onto a material surface, but they cannot control the graft density and graft chain length. Therefore, it is impossible to study the effects of these two factors on the improvement of the anti-protein non-specific adsorption performance of PVP on a substrate material. However, the above two factors are considered to be important factors affecting the anti-protein non-specific adsorption performance of materials.

SUMMARY OF THE INVENTION

The object of the present invention is to solve the problems of the prior art and to provide a method for improving the blood compatibility of a material surface by using a controllable grafting technique, which can control the graft density and the graft chain length.

The present invention first synthesized a mercapto PVP, and then used the chemical reaction of the mercapto group with gold to graft the polymer onto the Au surface to improve the anti-protein adsorption performance of the material surface, thereby obtaining a material surface with excellent blood compatibility.

An RAFT reagent of SC(Z)S-R, having the following structural formula, was used in the reversible addition fragmentation chain transfer polymerization, with the R group containing a carboxyl group at the end:

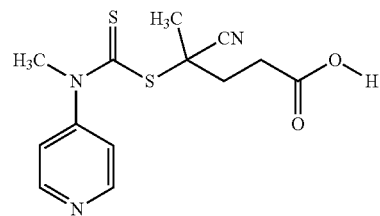 [SMILES: CN(C(=S)SC(C)(C#N)CCC(=O)O)c1ccncc1]

The structural formula of the compound $NH_2(CH_2)_nSH$ containing both an amino group and a mercapto group is as follows:

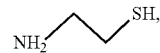

wherein the n value of the compound is defined to be 1-6.

Piranha lotion (piranha solution); mercapto PVP (HS-PVP)

The object of the present invention is achieved by the following technical solution:

A method for improving the blood compatibility of a material surface by using a controllable grafting technique is provided, comprising the following steps:

1) placing a monomer NVP, an RAFT reagent and a solvent acetonitrile in a container, adding an initiator AIBN, and mixing the same uniformly;

2) removing oxygen with liquid nitrogen, making the same react in an oil bath of 60° C. to 80° C.; after polymerization for 5-48 h, adding liquid nitrogen to quench and stop the reaction; adding absolute ether to the product for precipitation; keeping the resulted precipitate in a room-temperature vacuum oven until a constant weight is reached, thus obtaining PVP-COOH;

3) mixing the PVP-COOH with DCC and NHS; adding dry dichloromethane to the mixture in a nitrogen atmosphere, and making the same react in an ice water bath for 0.5-3 h;

4) adding mercaptoethylamine, and making the same react in darkness at room temperature for 6-18 h; evaporating the solvent to obtain a crude sample;

5) dissolving the crude sample obtained in Step 4) in water, and performing dialysis with deoxygenated water in darkness, and then obtaining HS-PVP by freeze-drying;

6) treating the surface of a gold sheet with a piranha solution;

7) using ethanol as a solvent to dissolve the HS-PVP to obtain an HS-PVP solution;

8) placing the HS-PVP solution in a PE tube, and placing the gold sheet obtained in Step 6) into the HS-PVP solution to allow a chemical adsorption reaction between the gold sheet and a mercapto group; and 9) taking the gold sheet of Step 8) out, and thoroughly washing it with deionized water and ethanol to obtain a surface having excellent blood compatibility.

In order to further achieve the object of the present invention, preferably, the molar ratio of the RAFT reagent to the monomer NVP is from 1:20 to 1:500.

Preferably, the molar ratio of the initiator AIBN to the RAFT reagent is from 1:2 to 1:20.

Preferably, the molar ratio of the PVP-COOH to DCC to NHS is from 1:1:1.2 to 1:4:4.8.

Preferably, the dichloromethane is used in an amount of 2-20 mL per gram of PVP-COOH.

Preferably, the molar ratio of the PVP-COOH to mercaptoethylamine is from 1:1 to 1:3.

Preferably, the dialysis time is 12-48 h, and the water is changed every 2-4 h; and the removing oxygen with liquid nitrogen is performed for 3-5 times.

Preferably, the volume ratio of hydrogen peroxide to concentrated sulfuric acid in the piranha solution is 3:7, and the treatment time is 5-15 min.

Preferably, the concentration of the HS-PVP (mercapto PVP) is 1-50 mg/mL.

Preferably, the chemical adsorption reaction between the gold sheet and the mercapto group is performed in darkness at a temperature of 25° C. to 37° C. for 0.5-3 h, with the oxygen content in the reaction less than 2 ppm.

The present invention has the following advantages compared to the prior art:

(1) The material surface with excellent blood compatibility prepared by the present invention has excellent anti-protein adsorption performance and biocompatibility;

(2) the material surface with excellent blood compatibility prepared by the present invention has good chemical stability and is not easy to be degraded;

(3) the material surface with excellent blood compatibility prepared by the present invention can inhibit the adhesion of human serum albumin by 95% and fibrinogen by about 85% on the surface thereof; and (4) the present invention can control the graft chain length of the grafted molecule, and can obtain the material surface modified by molecules of different graft molecular weights.

BRIEF DESCRIPTION OF THE DRAWINGS

FIG. 1-2 is an N spectrum of the blank gold surface obtained by the XPS test;

FIG. 1-3 is an O spectrum of the blank gold surface obtained by the XPS test;

FIG. 2-1 is a C spectrum of the gold surface obtained by the XPS test after PVP modification in Example 1;

FIG. 2-2 is an N spectrum of the gold surface obtained by the XPS test after PVP modification in Example 1;

FIG. 2-3 is an O spectrum of the gold surface obtained by the XPS test after PVP modification in Example 1;

FIG. 3-1 is a graph showing test results of the adsorbance of the human serum albumin HSA in Example 1;

FIG. 3-2 is a graph showing test results of the adsorbance of the human serum albumin HSA in Example 2;

FIG. 3-3 is a graph showing test results of the adsorbance of the human serum albumin HSA in Example 3;

FIG. 4-1 is a graph showing test results of the adsorbance of the fibrinogen Fg in Example 1;

FIG. 4-2 is a graph showing test results of the adsorbance of the fibrinogen Fg in Example 2; and FIG. 4-3 is a graph showing test results of the adsorbance of the fibrinogen Fg in Example 3.

DETAILED DESCRIPTION

Figure 1:
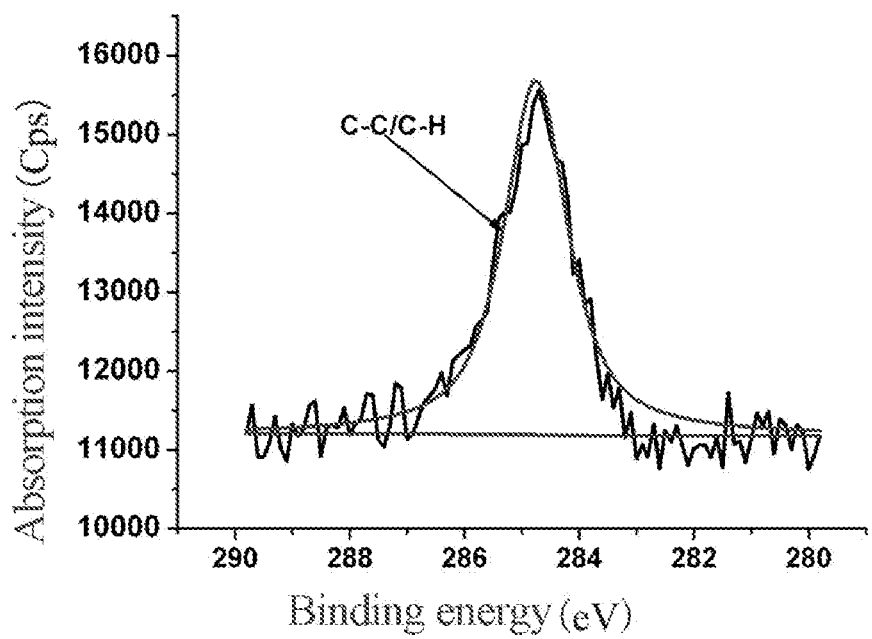
FIG. 1-1 is a C spectrum of a blank gold surface obtained by an XPS test.

In order to better understand the present invention, the present invention will be further described in conjunction with examples, but the scope of protection of the present invention is not limited thereto.

Example 1

A method for improving the blood compatibility of a material surface by using a controllable grafting technique is provided, comprising the following steps:

(1) Placing a monomer NVP (4 mL, 0.0371 mol), an RAFT reagent (0.2402 g, 6×10$^{-4}$ mol) and a solvent acetonitrile (4 mL) in an ampoule, and finally adding an initiator AIBN (0.028 g) and mixing the same uniformly; removing oxygen in the ampoule with liquid nitrogen for three times, making the same react in an oil bath at a constant temperature of 70° C. for 15 h, and quenching the ampoule in liquid nitrogen to stop the reaction;

(2) adding absolute ether to the product in the ampoule of Step (1) for precipitation; keeping the resulted precipitate in a room-temperature vacuum oven until a constant weight is reached, thus obtaining a PVP-COOH sample;

(3) placing the PVP-COOH sample (1 g), DCC (0.1212 g) and NHS (0.0744 g) in a two-necked flask, adding dry dichloromethane (5 mL) to the mixture in a nitrogen atmosphere, and making the same react in an ice water bath for 1 h; then adding mercaptoethylamine (0.0445 g), and making the same react in darkness at room temperature for 12 h; evaporating the solvent to obtain a crude sample;

(4) dissolving the crude sample obtained in Step (3) in water, and performing dialysis with deoxygenated water in darkness, and then obtaining an HS-PVP sample by freeze-drying;

(5) placing the surface of a gold sheet (1×1 cm) in a piranha lotion (piranha solution) for treatment;

(6) dissolving HS-PVP1 (20 mg) in ethanol (10 mL); and (7) placing the prepared HS-PVP1 solution (5 mL) in a PE tube, putting the gold sheet (having a diameter of 1 cm) obtained in Step (5) in the solution and taking it out after 150 min, and washing the gold sheet thoroughly with deionized water and ethanol to obtain a material surface with an anti-protein adsorption performance and excellent blood compatibility.

The present invention adopts X-ray photoelectron spectroscopy (XPS) of Axis UltraDCD to analyze the element composition and content of the surface of the gold sheet before and after self-assembly of PVP. The results of X-ray photoelectron spectroscopy are calibrated on the basis of C is (284.6 eV), and the spectra of the elements C, N, and S are fitted using the avantage software.

Figures 1, 2:
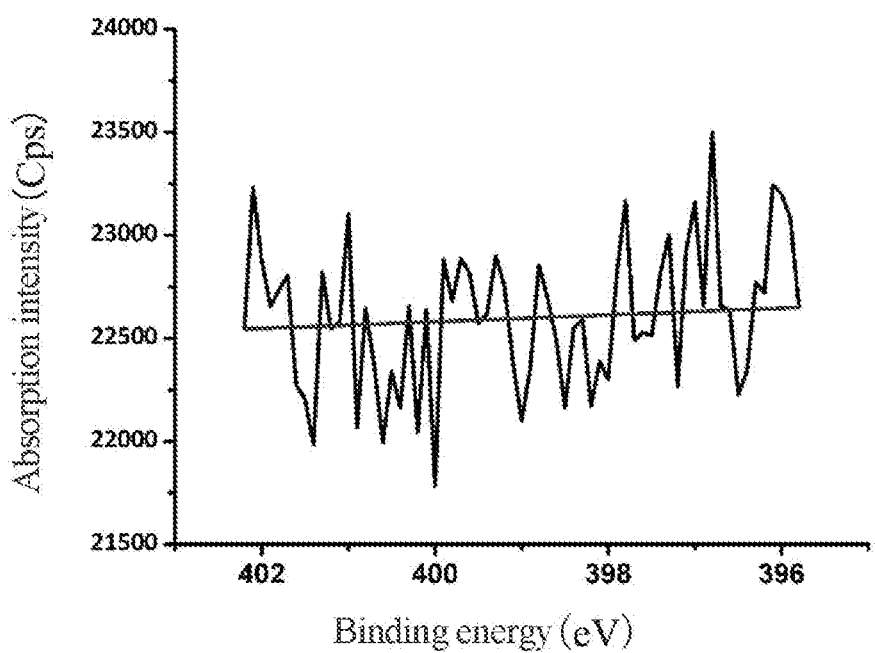
Figures 1, 2, 3:
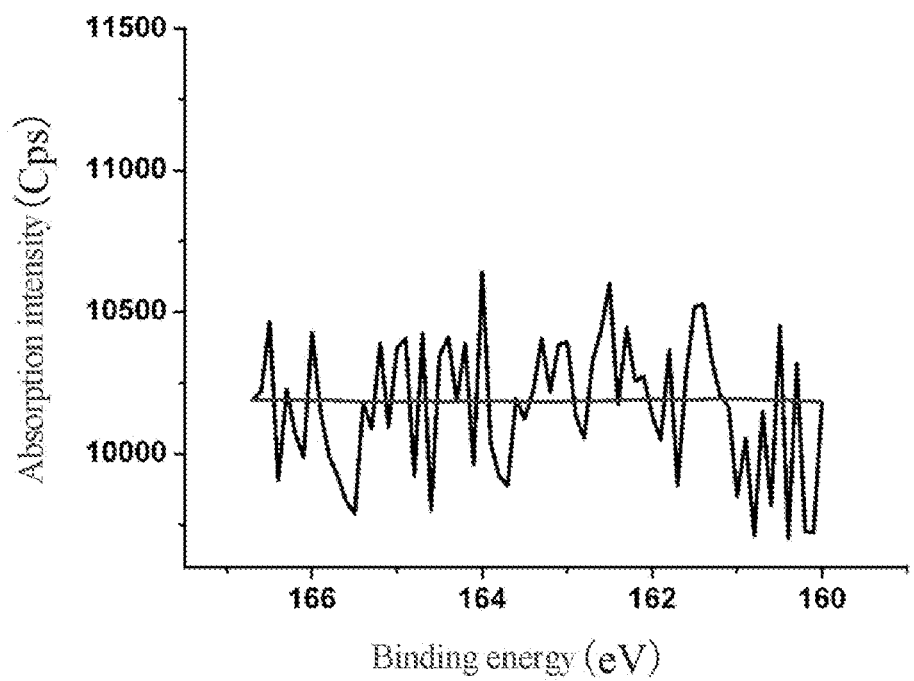
Figures 1, 2:
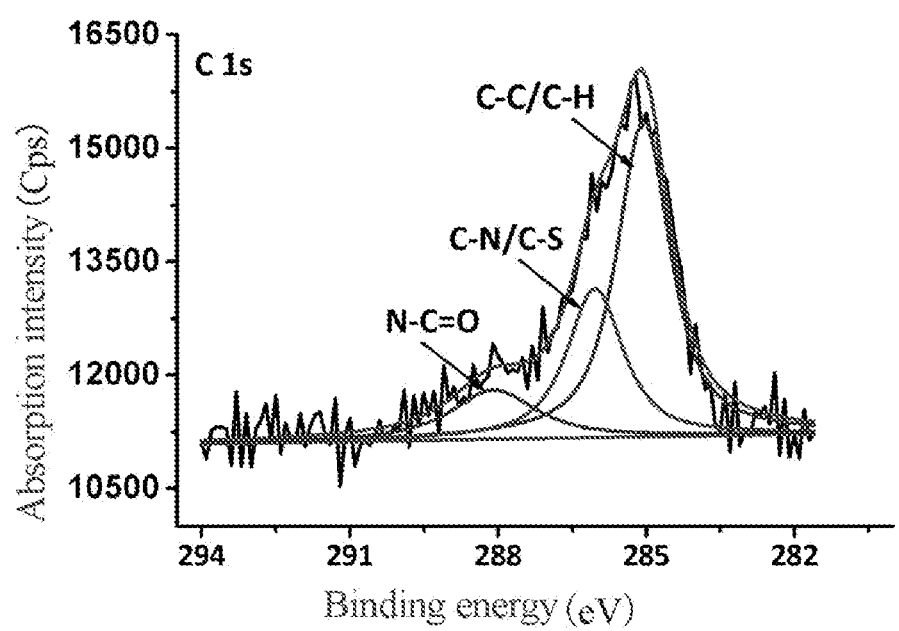
Figure 2:
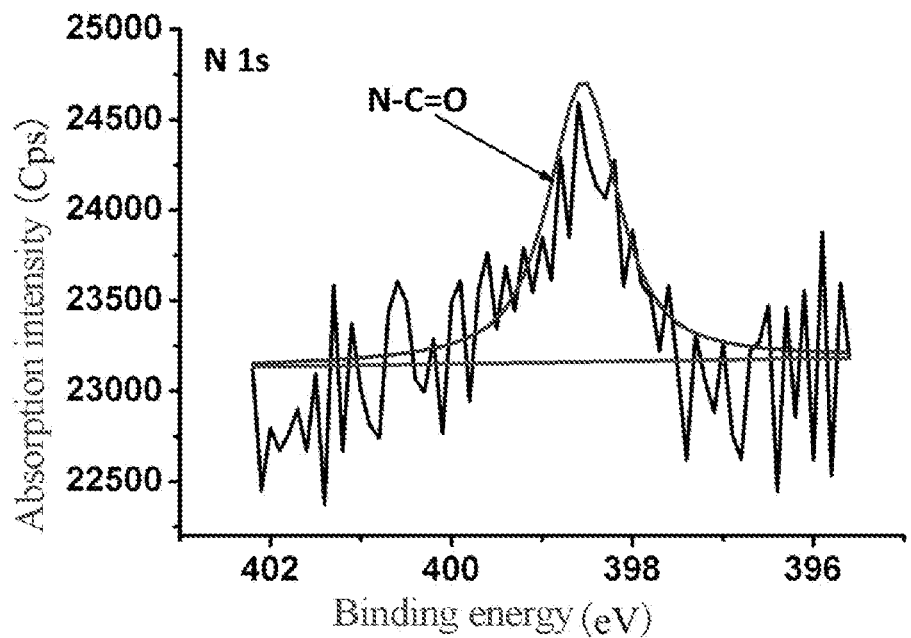
Figures 2, 3:
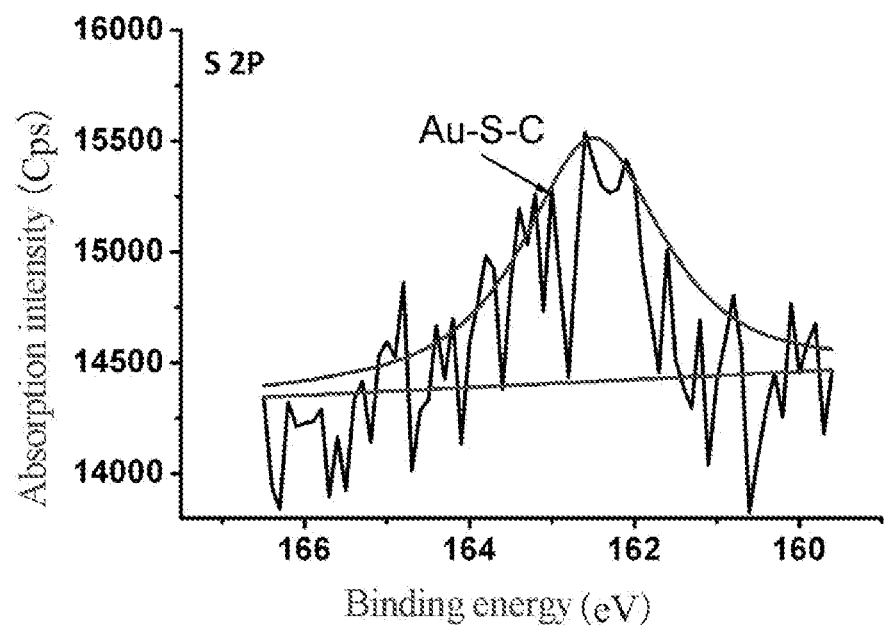
Figures 1, 3:
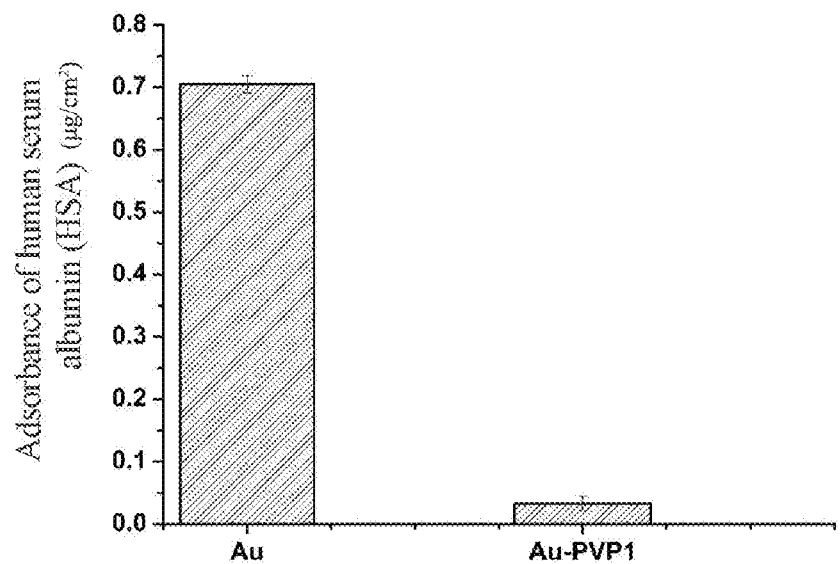
Figures 2, 3:
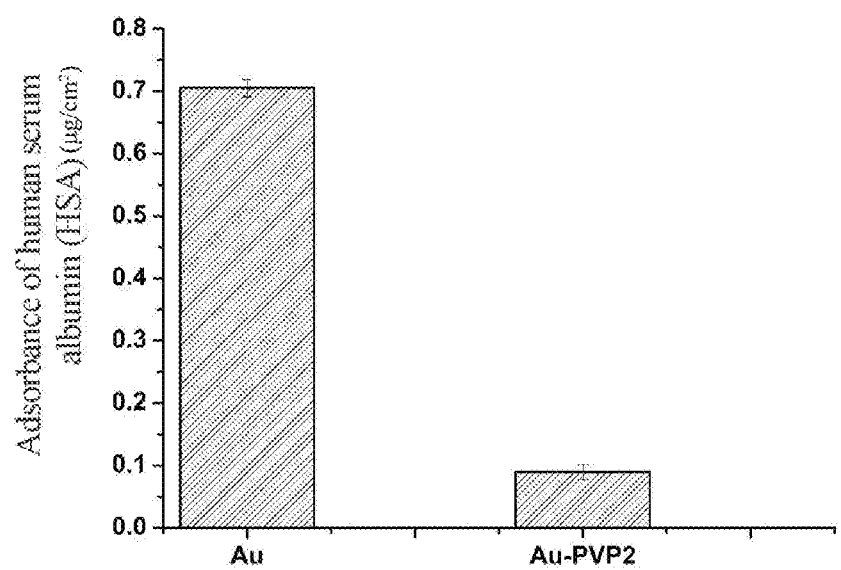
Figure 3:
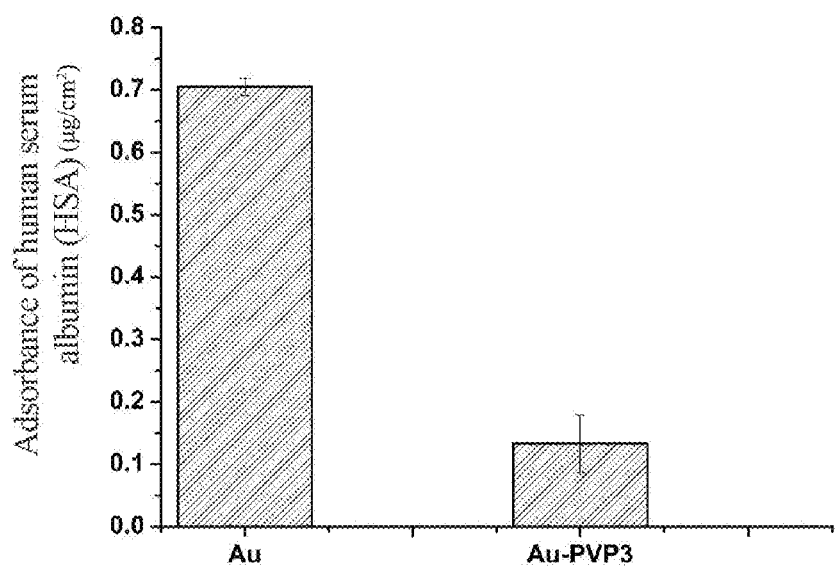

FIGS. 1-1, 1-2, 1-3, 2-1, 2-2 and 2-3 are XPS test charts of Example 1. After self-assembly of HS-PVP on the Au surface, the content of the elements of the surface changes significantly, so does the chemical environment of the elements. With reference to FIGS. 1-1, 1-2 and 1-3 that show the test results of a blank sample, the elements N, S, and C of the surface of the blank sample have only one bonding state. From FIGS. 2-1, 2-2 and 2-3 that show the test results of a modified material surface, it is found that the material surface modified by HS-PVP has elements N and S, and the element C has three bonding states. Comparison of the results of FIGS. 1-1, 1-2, 1-3, 2-1, 2-2 and 2-3 shows that HS-PVP1 can be successfully grafted onto the material surface.

Quartz crystal microbalance (QCM-D) can be used to study the adsorption behavior of proteins (human serum albumin and human fibrinogen) on the material surface of a gold sheet with self-assembled PVP; wherein the protein concentration is 1 mg/mL PBS solution, and the adsorbance is determined by F-change obtained by a QCM-D test and software fitting. Human blood contains a variety of proteins, of which human serum albumin is the most abundant. When the material is in contact with human blood, the adsorption of human serum albumin and fibrinogen on the material surface has an important influence on the formation of thrombus. Therefore, human serum albumin (HSA) and fibrinogen (Fg) are commonly used proteins for studying the blood compatibility of materials.

Figures 1, 4:
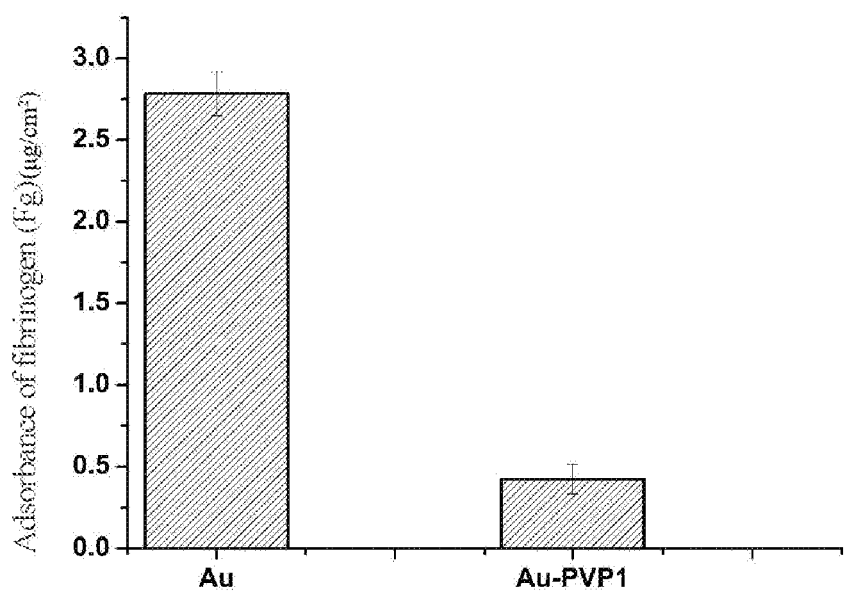
Figures 2, 4:
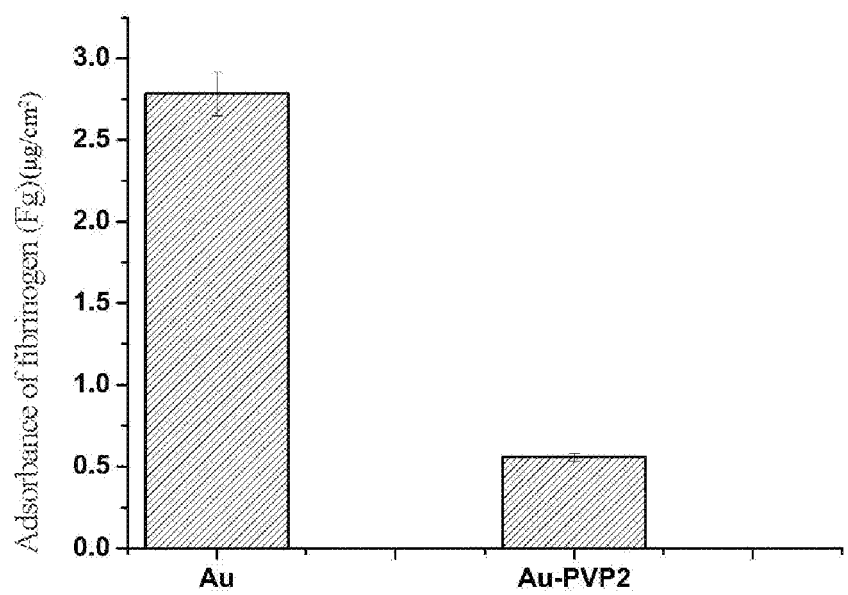
Figures 3, 4:
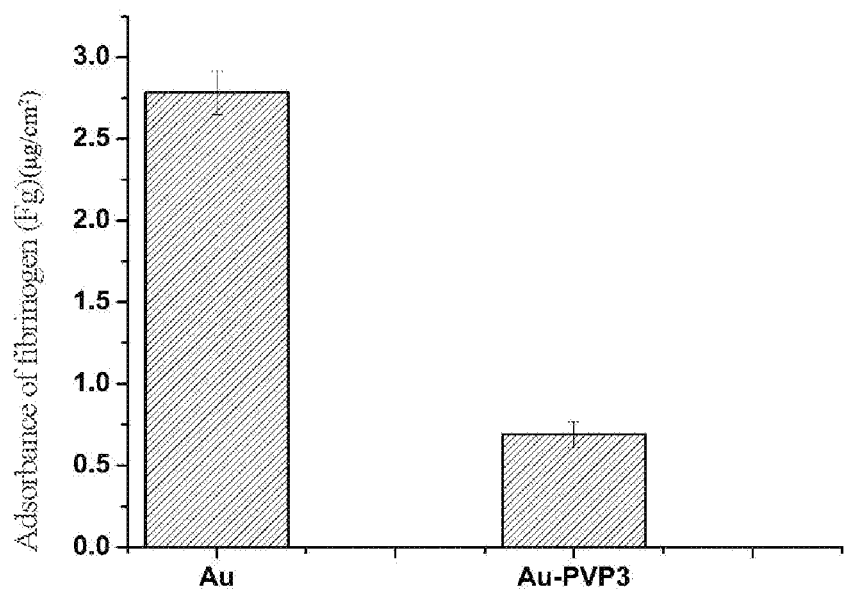

With Au as the blank sample and Au-PVP as the material modified by HS-PVP graft, FIGS. 3-1 and 4-1 show a histogram of the adsorbance of human serum albumin (HSA) and fibrinogen (Fg) on the surface of the materials (Au and Au-PVP) obtained by the quartz crystal microbalance (QCM-D) test, respectively. It can be seen from the test results that PVP successfully modified the material surface and, compared with the blank sample, the modified material surface could reduce the adhesion of human serum albumin by 95.32% and fibrinogen by 84.76% on the surface. The results of cell compatibility experiments show that 99.51% of the cells could survive.

As can be seen from FIGS. 3-1 and 4-1, the modified material surface could significantly reduce the adhesion of human serum albumin and fibrinogen to its surface compared to the blank Au.

The grafting process of HS-PVP on the material surface was tested using a quartz crystal microbalance (QCM-D). The core of the quartz crystal microbalance (QCM) is a quartz crystal sensor. When a voltage is applied across the sensor, the quartz crystal induces a small shear vibration at the resonant frequency. If a layer of substance is adsorbed on the surface of the crystal (i.e., on the surface of a sample), the vibration of the crystal is weakened, and the decrease in the vibration or frequency varies with the thickness and density of the film. That is, when a substance is adsorbed on the surface of a chip, the frequency of the chip will decrease, i.e., the change in the surface mass of the surface crystal causes the change in frequency ($\Delta f$), with a curve of $\Delta f$ representing the change in the surface mass of the sample.

In the case of ethanol as the baseline, the $\Delta f$ curve changed significantly when the ethanol solution containing HS-PVP was introduced. A turning point occurred at about 30 minutes, and the change in $\Delta f$ became slower; when the self-assembly time was 150 min, $\Delta f$ basically reached equilibrium; after 150 min, the ethanol was introduced, and the increase was relatively large, with the corresponding $\Delta f$ being −19.67 Hz, −21.69 Hz and −24.59 Hz, respectively. This indicated that when the HS-PVP solution contacted the Au surface, there were two processes including self-assembly of HS-PVP and physical adsorption on the Au surface. The change of $\Delta f$ after the introduction of ethanol might be caused by some HS-PVP only physically adsorbed on the Au surface being washed away by ethanol; after 10 min, the $\Delta f$ curve reached equilibrium again, and HS-PVP was firmly grafted onto the material surface. Since the liquid introduced before and after the grafting was uniform, the $\Delta f$ curve was again brought to equilibrium after the solvent that could dissolve the HS-PVP was introduced; that is, the mass of the HS-PVP grafted to the material reached a stable value, and the grafted HS-PVP could not be detached from the surface of the sample by excessive solvent washing. It was indicated that under the current conditions, HS-PVP was grafted onto the material surface and could not be washed off, showing that HS-PVP had been firmly grafted onto the material surface.

The mass of HS-PVP1 grafted onto the material surface in the ethanol solution was approximately 2.03 $\mu g/cm^2$ by fitting with QTools software. It was indicated that in the process of HS-PVP grafting onto the material surface, the mass of HS-PVP grafted on the material surface would change with time. The purpose was to demonstrate the process of mass change of HS-PVP during being grafted onto the material surface. 2.03 $\mu g/cm^2$ was obtained by fitting with QTools, a self-contained software of the quartz crystal microbalance (QCM0-D), which indicated the graft density of HS-PVP grafted onto the material surface.

Example 2

A method for improving the blood compatibility of a material surface by using a controllable grafting technique is provided, comprising the following steps:

(1) Placing a monomer NVP (4 mL, 0.0371 mol), an RAFT reagent (0.1201 g, 3×10$^{-4}$ mol) and a solvent acetonitrile (4 mL) in an ampoule, and finally adding an initiator AIBN (0.014 g) and mixing the same uniformly; removing oxygen in the ampoule with liquid nitrogen for three times, making the same react in an oil bath at a constant temperature of 80° C. for 24 h, and quenching the ampoule in liquid nitrogen to stop the reaction;

(2) adding absolute ether to the product in the ampoule of Step (1) for precipitation; keeping the resulted precipitate in a room-temperature vacuum oven until a constant weight is reached, thus obtaining a PVP-COOH sample;

(3) placing the PVP-COOH sample (1 g), DCC (0.0606 g) and NHS (0.0372 g) in a two-necked flask, adding dry dichloromethane (10 mL) to the mixture in a nitrogen atmosphere, and making the same react in an ice water bath for 1 h; then adding mercaptoethylamine (0.0225 g), and making the same react in darkness at room temperature for 12 h; evaporating the solvent to obtain a crude sample;

(4) dissolving the crude sample obtained in Step (3) in water, and performing dialysis with deoxygenated water in darkness, and then obtaining a final sample HS-PVP2 by freeze-drying;

(5) placing the surface of a gold sheet (1×1 cm) in a piranha lotion for treatment for 15 min;

(6) dissolving HS-PVP2 (30 mg) in ethanol (10 mL); and (7) placing the prepared HS-PVP solution (5 mL) in a PE tube, putting the gold sheet (having a diameter of 1 cm) obtained in Step (5) in the solution and taking it out after 150 min, and washing the gold sheet thoroughly with deionized water and ethanol to obtain a material surface with an anti-protein adsorption performance and excellent blood compatibility.

FIGS. 3-2 and 4-2 are a histogram of the adsorbance of human serum albumin (HSA) and fibrinogen (Fg) on the material surface. The test method of FIGS. 3-2 and 4-2 was the same as that in Example 1, except that Example 2 used another HS-PVP (HS-PVP2) with different molecular weight. It can be seen from the results of FIGS. 3-2 and 4-2 that PVP successfully modified the material surface, and the modified material surface could reduce the adhesion of human serum albumin by 88.31% and fibrinogen by 78.97% to the surface thereof compared with the blank sample.

Example 3

A method for improving the blood compatibility of a material surface by using a controllable grafting technique is provided, comprising the following steps:

(1) Placing a monomer NVP (4 mL, 0.0371 mol), an RAFT reagent (0.0601 g, $1.5\times10^{-4}$ mol) and a solvent acetonitrile (4 mL) in an ampoule, and finally adding an initiator AIBN (0.010 g) and mixing the same uniformly; removing oxygen in the ampoule with liquid nitrogen for three times, making the same react in an oil bath at a constant temperature of 80° C. for 36 h, and quenching the ampoule in liquid nitrogen to stop the reaction;

(2) adding absolute ether to the product in the ampoule of Step (1) for precipitation; keeping the resulted precipitate in a room-temperature vacuum oven until a constant weight is reached, thus obtaining a PVP-COOH sample;

(3) placing the PVP-COOH sample (1 g), DCC (0.0303 g) and NHS (0.0186 g) in a two-necked flask, adding dry dichloromethane (10 mL) to the mixture in a nitrogen atmosphere, and making the same react in an ice water bath for 1 h; then adding mercaptoethylamine (0.0113 g), and making the same react in darkness at room temperature for 24 h; evaporating the solvent to obtain a crude sample;

(4) dissolving the crude sample obtained in Step (3) in water, and performing dialysis with deoxygenated water in darkness, and then obtaining a final sample HS-PVP3 by freeze-drying;

(5) placing the surface of a gold sheet (1×1 cm) in a piranha lotion for treatment for 15 min;

(6) dissolving HS-PVP3 (50 mg) in ethanol (10 mL); and (7) placing the prepared HS-PVP3 solution (5 mL) in a PE tube, putting the gold sheet (having a diameter of 1 cm) obtained in Step (5) in the solution and taking it out after 150 min, and washing the gold sheet thoroughly with deionized water and ethanol to obtain a material surface with excellent anti-protein adsorption performance and blood compatibility.

FIGS. 3-3 and 4-3 are a histogram of the adsorbance of human serum albumin (HSA) and fibrinogen (Fg) on the material surface. The test method of FIGS. 3-3 and 4-3 was the same as that in Example 1. Similar to Example 1, Example 3 used another HS-PVP (HS-PVP3) with different molecular weight. It can be seen from the test results that PVP successfully modified the material surface, and the modified material surface could reduce the adhesion of human serum albumin by 81.21% and fibrinogen by 75.23% to the surface thereof compared with the blank sample. And the results of cell compatibility experiments show that 98% of the cells could survive.

Controlling the graft density was achieved in the present invention by controlling the contact time of HS-PVP with the material surface, and controlling the graft chain length was achieved by controlling the molecular weight of HS-PVP, with HS-PVP of different molecular weights grafted on the material surface to produce a material surface modified by PVP of different molecular weights.

TABLE 1

| Sample | Number-average molecular weight (Mw) | Molecular weight distribution (PDI) |
|---|---|---|
| HS-PVP1 | Mw = $3.52 \times 10^3$ | 1.22 |
| HS-PVP2 | Mw = $6.14 \times 10^3$ | 1.26 |
| HS-PVP3 | Mw = $9.84 \times 10^3$ | 1.35 |

Table 1 shows the molecular weight and molecular weight distribution of the HS-PVP used in Examples 1-3, indicating that the present invention can control the length of the grafted molecule (i.e., the graft chain) by preparing samples of different molecular weights for grafting experiments.

FIGS. 3-1, 3-2, 3-3, 4-1, 4-2 and 4-3 are a histogram of the adsorption performance of human serum albumin and fibrinogen on the material surface modified by molecules of different graft molecular weights. It can be clearly seen from these figures that the amount of protein adsorbed on the material surface modified by HS-PVP was significantly reduced by more than 75% compared with the blank sample Au, and the non-specific adsorption of human serum albumin and fibrinogen was significantly reduced, indicating that the prepared sample had excellent blood compatibility.

It can be seen from Examples 1-3 that the present invention can control the graft chain length of the grafted molecule and obtain the material surface modified by molecules of different graft molecular weights, and the prepared material surface can effectively inhibit adhesion of human serum albumin and fibrinogen on the surface to exhibit excellent blood compatibility.

What is claimed is:

1. A method for improving blood compatibility of a material surface by using a controllable grafting technique, comprising:
   1) placing a monomer NVP, an RAFT reagent and a solvent acetonitrile in a container, adding an initiator AIBN, and mixing uniformly;
   2) removing oxygen with liquid nitrogen from the container in step 1), reacting the mixture in step 1) in an oil bath of 60° C. to 80° C.; after polymerization for 5-48 h, adding liquid nitrogen to quench and stop the reaction forming a product; adding absolute ether to the product for precipitation; keeping a resulting precipitate in a room-temperature vacuum oven until a constant weight is reached, thus obtaining PVP-COOH;
   3) mixing the PVP-COOH with DCC and NHS; adding dry dichloromethane to the mixture in a nitrogen atmosphere, and reacting in an ice water bath for 0.5-3 h;
   4) adding mercaptoethylamine to the product of step 3), and reacting in darkness at room temperature for 6-18 h; evaporating the solvent to obtain a crude sample;
   5) dissolving the crude sample obtained in Step 4) in water, and performing dialysis with deoxygenated water in darkness, and then obtaining HS-PVP by freeze-drying;
   6) treating the surface of a gold sheet with a piranha solution;
   7) using ethanol as a solvent to dissolve the HS-PVP to obtain an HS-PVP solution;
   8) placing the HS-PVP solution in a PE tube, and placing the gold sheet obtained in Step 6) into the HS-PVP solution to allow a chemical adsorption reaction between the gold sheet and a mercapto group; and
   9) taking the gold sheet of Step 8) out, and thoroughly washing it with deionized water and ethanol to obtain a surface having excellent blood compatibility.

2. The method according to claim 1, wherein the molar ratio of the RAFT reagent to the monomer NVP is from 1:20 to 1:500.

3. The method according to claim 1, wherein the molar ratio of the initiator AIBN to the RAFT reagent is from 1:2 to 1:20.

4. The method according to claim 1, wherein the molar ratio of the PVP-COOH to DCC to NHS is from 1:1:1.2 to 1:4:4.8.

5. The method according to claim 1, wherein the dichloromethane is used in an amount of 2-20 mL per gram of PVP-COOH.

6. The method according to claim 1, wherein the molar ratio of the PVP-COOH to mercaptoethylamine is from 1:1 to 1:3.

7. The method according to claim 1, wherein the dialysis time is 12-48 h, and the water is changed every 2-4 h; the removing oxygen with liquid nitrogen is performed 3-5 times.

8. The method according to claim 1, wherein the volume ratio of hydrogen peroxide to concentrated sulfuric acid in the piranha solution is 3:7, and the treatment time is 5-15 min.

9. The method according to claim 1, wherein the concentration of the HS-PVP is 1-50 mg/mL.

10. The method according to claim 1, wherein the chemical adsorption reaction between the gold sheet and the mercapto group is performed in darkness at a temperature of 25° C. to 37° C. for 0.5-3 h, with the oxygen content in the reaction less than 2 ppm.

* * * * *

UNITED STATES PATENT AND TRADEMARK OFFICE
CERTIFICATE OF CORRECTION

PATENT NO. : 10,889,898 B2
APPLICATION NO. : 16/305923
DATED : January 12, 2021
INVENTOR(S) : Li Ren et al.

Page 1 of 1

It is certified that error appears in the above-identified patent and that said Letters Patent is hereby corrected as shown below:

On the Title Page

Item (73), Column 1, Assignee, Line 1, Delete "South China University of Technology" and insert
-- South China University of Technology (CN) --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*